United States Patent
Ganesan et al.

(10) Patent No.: US 10,728,036 B2
(45) Date of Patent: Jul. 28, 2020

(54) CRYPTOGRAPHICALLY LINKING RELATED EVENTS PROCESSED ACROSS MULTIPLE PROCESSING SYSTEMS

(71) Applicant: PeerNova, Inc., San Jose, CA (US)

(72) Inventors: Gangesh Kumar Ganesan, Mountain View, CA (US); Benedicto de Souza Franco, Jr., Sunnyvale, CA (US); Alexei Kozlenok, San Jose, CA (US)

(73) Assignee: PEERNOVA, INC., San Jose, CA (US)

( * ) Notice: Subject to any disclaimer, the term of this patent is extended or adjusted under 35 U.S.C. 154(b) by 292 days.

(21) Appl. No.: 15/696,136

(22) Filed: Sep. 5, 2017

(65) Prior Publication Data

US 2019/0074974 A1    Mar. 7, 2019

(51) Int. Cl.
| | | |
|---|---|---|
| *H04L 9/32* | (2006.01) | |
| *H04L 9/06* | (2006.01) | |
| *G06F 16/00* | (2019.01) | |
| *H04L 9/08* | (2006.01) | |

(52) U.S. Cl.
CPC ............ *H04L 9/3242* (2013.01); *G06F 16/00* (2019.01); *H04L 9/0643* (2013.01); *H04L 9/0894* (2013.01); *H04L 9/3239* (2013.01); *H04L 9/3297* (2013.01); *H04L 2209/38* (2013.01)

(58) Field of Classification Search
CPC ... H04L 9/3242; H04L 9/0894; H04L 9/3297; H04L 9/3239; H04L 9/0643; H04L 2209/38; H04L 9/32; H04L 9/06; G06F 16/00; G06Q 20/04
USPC ..................... 713/168; 705/35, 50
See application file for complete search history.

(56) References Cited

U.S. PATENT DOCUMENTS

| | | | |
|---|---|---|---|
| 2010/0049582 A1 | 2/2010 | Abo-Hasna et al. | |
| 2014/0156480 A1* | 6/2014 | Qaim-Maqami | G06Q 40/02 705/35 |
| 2014/0298034 A1* | 10/2014 | Watanabe | H04L 9/3236 713/176 |
| 2016/0330027 A1 | 11/2016 | Ebrahimi | |
| 2016/0342812 A1* | 11/2016 | Lynch | H04L 9/3242 |
| 2016/0365978 A1 | 12/2016 | Ganesan et al. | |

(Continued)

OTHER PUBLICATIONS

PCT International Search Report and Written Opinion, PCT Application No. PCT/US18/48734, dated Nov. 26, 2018, 15 pages.

*Primary Examiner* — Daniel B Potratz
*Assistant Examiner* — Quazi Farooqui
(74) *Attorney, Agent, or Firm* — Fenwick & West LLP

(57) ABSTRACT

In processing a transaction, a data storage system of a processing system stores and updates a progression created for the transaction that represents a timeline of events that occurred related to the transaction. A progression for a transaction that is processed across multiple processing systems is organized as a chronological chain of segments. Each segment in the progression includes records for events processed by a given processing system prior to the transaction reaching an intermediate state or a terminal state. When the transaction reaches a terminal state, the segmented progression includes records associated with all of the events that occurred in relation to the transaction across multiple processing systems. A segment in the progression is cryptographically linked to a previous segment in the progression using a linking object that includes a transaction signature of the last record stored in the previous segment.

18 Claims, 15 Drawing Sheets

(56) References Cited

U.S. PATENT DOCUMENTS

2017/0033932 A1    2/2017   Truu et al.
2017/0046651 A1    2/2017   Lin et al.
2018/0173747 A1*   6/2018   Baird, III ............ G06F 16/2365
2018/0183602 A1*   6/2018   Campagna ............ H04L 9/3247

* cited by examiner

CRYPTOGRAPHICALLY LINKING RELATED EVENTS PROCESSED ACROSS MULTIPLE PROCESSING SYSTEMS

BACKGROUND

1. Field of Art

The present disclosure generally pertains to the storage of data, and in particular to capturing each state of a transaction in a set of cryptographically linked records whose integrity can be verified using mathematical cryptographic proofs.

2. Description of the Related Art

Entitles like financial institutions process many transactions on a daily basis. Each transaction involves multiple steps and processes. For example, transferring funds from a first person to a second person may involve verifying the identity of the first person, checking whether the first person has enough funds in his account for the transfer, checking whether the transfer has the characteristics of a money laundering type of transfer, etc. These steps may be performed across multiple financial institutions. Consequently, the data related to such transactions is typically stored across disparate storage systems.

Financial transactions need to be verifiable in order to detect or rule out fraudulent activity. This verification process often entails evaluating all of the data associated with a given transaction. To support this verification process, in scenarios where multiple institutions process a given financial transaction, the data generated in relation to a transaction processed by a given institution is transferred in its entirety to another institution that also processes the transaction. Transmission of such data across multiple institutions is very costly given the large volume of data generated when financial transactions are processed. Further, the sensitive nature of financial data makes the transmission of this data across institution boundaries highly undesirable.

SUMMARY

A data storage system of a processing system stores multiple progressions that are each created for a different transaction. A progression created for a transaction represents a timeline of events that occurred and are related to the transaction. The progression includes multiple records that are chronologically and cryptographically linked. Each record of the progression represents an event related to the transaction.

Events for a particular transaction may be processed across different processing systems. In particular, a transaction that begins at one processing system may reach an intermediate state, after which a different processing system may resume processing events related to the transaction. The transaction may continue to transition through various intermediate states until the transaction reaches a terminal state. At each intermediate state, the processing system that was processing events related to the transaction may hand off processing of subsequent events to a new processing system.

A progression for a transaction that is processed across multiple processing systems is organized as a chronological chain of segments. Each segment in the progression includes records for events processed by a given processing system prior to the transaction reaching an intermediate state or a terminal state. In operation, the first segment of a segmented progression includes records for events processed by a processing system from when the transaction began to when the transaction reached a first intermediate state. Each subsequent segment of the segmented progression includes records for events processed by a processing system until the transaction reaches a new intermediate state or a terminal state. When the transaction reaches a terminal state, the segmented progression includes records associated with all of the events that occurred in relation to the transaction across multiple processing systems.

To link records across segments, when a transaction reaches an intermediate state at a given processing system, the processing system creates a linking object based on the last record of the current segment. The linking object includes a cryptographic hash of the transaction signature included in the last record added to the segment. The processing system transmits the linking object transmitted to one or more other processing systems that will resume processing of the transaction. When the processing of the transaction resumes at the recipient processing system, the recipient processing system creates a new segment for the progression associated with the transaction. The new segment stores records related to events generated at the recipient processing system. For the first record in the new segment, the progression module of the recipient processing system generates a transaction signature using a cryptographic hash of the event signature associated with the record and the transaction signature included in the linking record.

In such a manner, records related to the transaction that is processed across multiple processing systems are chronologically organized and cryptographically linked in the segmented progression. Importantly, through the use of linking records, the records themselves need not be transferred across the processing systems to create the cryptographic link. The use of linking records thus creates a robust system for verifying the integrity of the data related to the transaction without transmitting large amounts of data across processing system boundaries, thus increasing the efficiency and the overall security of the system.

Figure 1:
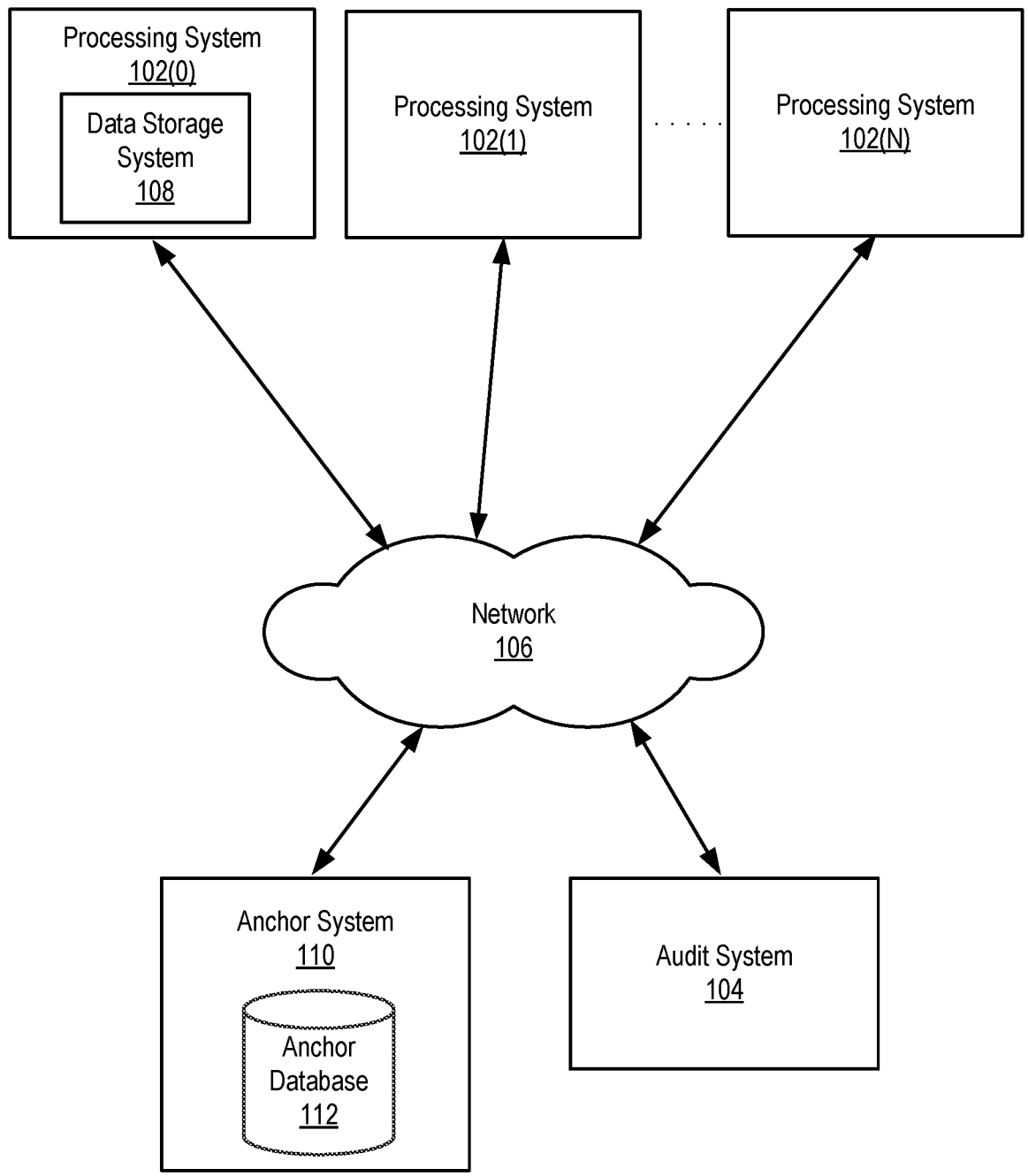
FIG. 1 is a block diagram of a processing environment in accordance with one embodiment.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

The figures use like reference numerals to identify like elements. A letter after a reference numeral, such as "302A," indicates the text refers specifically to the element having that particular reference numeral. A reference numeral in the text without a following letter, such as "302," refers to any or all of the elements in the figures bearing that reference numeral (e.g., "302" in the text refers to reference numerals "302A," "302B," "302C" and/or "302D" in the figures).

DETAILED DESCRIPTION

Computing Environment

FIG. 1 illustrates a data storage environment 200 in accordance with one embodiment. The data storage environment 200 includes processing systems 102(0)-(N) (collectively, processing systems 102), anchor system 110, and audit system 104 communicatively coupled via a network 106. Although the illustrated environment 200 includes only a select number of each entity, other embodiments can include more or less of each entity.

Each of the processing systems 102 (referred to individually as a "processing system 102") is a computer system that processes transactions. A transaction is one or more related events performed for the purpose of achieving a certain result. In one embodiment, a processing system 102 is the computer system of a financial institution that processes financial transactions. For example, the financial transactions may be one or more of the following: transfers between financial accounts, security trades, purchases of goods or services, payments, and loan underwriting. Processing a transaction involves multiple steps and the execution of multiple processes. For example, transferring funds from a first account to a second account may involve: validating that the first and second accounts exist, verifying that the user that initiated the transfer is authorized to make the request, determining whether the first account has sufficient funds for the transfer, determining whether the amount of the transfer exceeds an established limit, determining whether the transfer has the characteristics of a money laundering type of transfer, etc. The processing system 102 may process transactions in collaboration with other systems, such as a different processing system 102.

The processing system 102 includes a data storage system 108 that stores data corresponding to each event of a transaction. The data for a given transaction is organized into a progression that includes chronologically and cryptographically linked records. Each record represents a different event of the transaction associated with the progression. In the embodiment where multiple processing systems 102 collaborate to process transactions, each processing system 102 may store a subset of records of a progression or progressions that are linked to other progressions stored by another processing system 102. Further, details regarding the data storage system 108 are provided below with reference to FIG. 2.

The anchor system 110 maintains anchors used for auditing the data storage system 108. In particular, the data stored in the data storage system 108 is intended to be immutable, and auditing the data storage system 108 verifies that data stored in the data storage system 108 has not been modified or otherwise tampered with. The anchor system 110 and audit system 104 in combination confirm that data stored by the data storage system 108 has not been modified. When the data storage system 108 adds a record representing an event to a progression of a transaction, the data storage system 108 transmits a copy of the record to the anchor system 110 as an export anchor. In some embodiments, the data storage system 108 transmits the export anchor only if the given event satisfies export criteria.

The anchor system 110 includes an anchor database 112 that stores export anchors received from the data storage system 108. In some embodiments, the data storage system 108 does not have access to the anchors stored by the anchor system 110. Since the anchors stored by the anchor system 110 are used to audit the data storage system 108, the anchor system 110 is maintained separately from the data storage system 108 (e.g., a different entity manages the anchor system 110). Thus, even if data storage system 108 has a security breach, the data stored by the anchor system 110 will not be susceptible to being modified.

When the anchor system 110 receives an export anchor from the data storage system 108, the anchor system 110 stores the export anchor in the anchor database 112. In one embodiment, the anchor system 110 stores, in conjunction with the export anchor, an identifier that may be used to identify the corresponding record stored by the data storage system 108. The identifier may be, for example, a reference number or a storage location of the record. In one embodiment, if the anchor database 112 includes one or more other anchors associated with the same transaction as that of the received export anchor, the anchor system 110 links the received export anchor with the one or more other anchors associated with the same transaction.

In one embodiment, when the anchor system 110 receives an export anchor from the data storage system 108, the anchor system 110 also creates an import anchor based on the export anchor. The anchor system 110 creates the import anchor by hashing the export anchor with information associated with the time at which the import anchor is created, such as the present time (e.g., current date and/or current clock time). Since the import hash is created using information associated with the present time at which the import anchor is created, it is unfeasible for the import anchor to be recreated in the future. Hence, the import hash provides proof that the hash was created on the current date and/or time.

In one embodiment, to create the import anchor, the anchor system 110 requests a time stamp with the current date and/or time from a third party entity. The third party entity is a trusted time stamping authority. The anchor system 110 receives the time stamp signed by the time stamping authority and hashes the time stamp with the export anchor to create the import anchor. In another embodiment, the anchor system 110 has a copy of the export anchor stored in a Bitcoin blockchain. The anchor system 110 receives the block number of the block in which the copy was stored in the blockchain and hashes the block number with the export anchor to create the import anchor. In another embodiment, the anchor system 110 creates the import anchor by hashing the export anchor with information from a current publication. For example, the export anchor may be hashed with the text from the front page of a newspaper published on that day.

The anchor system 110 stores the import anchor in the anchor database 112. Additionally, the anchor system 110 transmits the import anchor to the data storage system 108. The data storage system 108 may add a new record to the progression that includes the export anchor. The data storage system 108 may also include the import anchor in the new record. Additionally, the data storage system 108 identifies the transaction signature included in the record added to the progression prior to the new record and hashes the signature with the import anchor to create a transaction signature for the new record corresponding to the import anchor. The created transaction signature is included in the new record. Adding the import anchor to the progression provides a proof of time and makes it infeasible for the progression to be recreated at a later time, for example, by a malicious entity trying to modify the data stored by the data storage system 108. In one embodiment, an identifier of the record added to the progression based on the import anchor is stored as metadata with the import anchor in the anchor database 112.

The audit system 104 is a computer system with the capabilities to audit the data storage system 108 to determine if data stored by the data storage system 108 has been altered. The audit system 104 may be, for example, the computer system of a government agency or some other trusted third-party auditor. The audit system 104 may audit the data storage system 108 periodically or upon request from a user of the audit system 104. The audit system 104 has access to the data stored by the data storage system 108 in order to be able to audit the data storage system 108. Permission to access the data is granted by the data storage system 108.

When the audit system 104 determines to audit the data storage system 108, the audit system 104 retrieves export and import anchors from the anchor database 112. In one embodiment, the audit system 104 retrieves all of the anchors stored in the anchor database 112. In another embodiment, the audit system 104 retrieves select anchors (a subset of the stored anchors). For example, the audit system 104 may retrieve a random sampling of anchors or anchors associated with a specific progression/transaction.

For each export anchor retrieved, the audit system 104 obtains the corresponding record stored by the data storage system 108. In one embodiment, the record is identified using an identifier of the record stored with the export anchor in the anchor database 112. The audit system 104 compares the export anchor with the identified record. If the export anchor and the identified record do not match, the audit system 104 determines that data stored by the data storage system 108 has been tampered with and modified. At the very least, the record has been modified.

In one embodiment, at a first stage the audit system 104 compares a transaction signature included in the export anchor in the anchor database 112 with a transaction signature included in the identified record in the progression stored in the data storage system 108. If the signatures do not match, the audit system 104 determines that data stored by the data storage system 108 has been modified. However, the export anchor and the identified record include hashes used to create their corresponding transaction signatures (e.g., hashes of the Merkel tree). Based on these hashes, the audit system 104 can determine the specific data that was modified.

Additionally, for each import anchor retrieved by the audit system 104 from the anchor database 112, the audit system 104 identifies the corresponding record stored with the data storage system 108 using an identifier of the record stored with the import anchor. The audit system 104 compares the import anchor included in the record of the progression stored in the data storage system 108 with the import anchor retrieved from the anchor database 112. If the import anchors do not match, the audit system 104 determines that data stored by the data storage system 108 has been modified.

The network 106 represents the communication pathways between the processing system 102, the anchor system 110, and the audit systems 104. In one embodiment, the network 106 is the Internet and uses standard communications technologies and/or protocols. The network 106 can also utilize dedicated, custom, or private communications links that are not necessarily part of the Internet. The network 106 may comprise any combination of local area and/or wide area networks, using both wired and wireless communication systems. In one embodiment, information exchanged via the network 106 is cryptographically encrypted and decrypted using cryptographic keys of the senders and the intended recipients.

Figure 2:
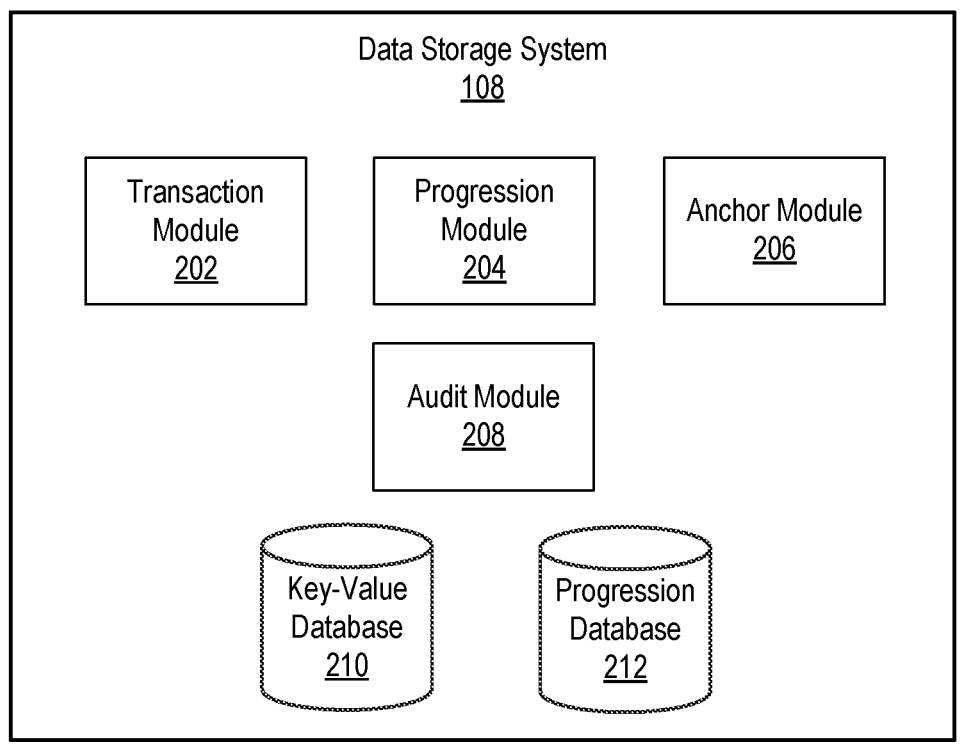
FIG. 2 is a block diagram of a data storage system in accordance with one embodiment.

FIG. 2 is a block diagram of the data storage system 108 in accordance with one embodiment. The data storage system 108 includes a transaction module 202, a progression module 204, an anchor module 206, an audit module 208, a key-value database 210, and a progression database 212. Those of skill in the art will recognize that other embodiments of the data storage system 108 can have different and/or other components than the ones described here, and that the functionalities can be distributed among the components in a different manner.

The transaction module 202 stores data for an event. When an event for a transaction occurs, the transaction module 202 receives data from the processing system 102 for the event. An event may be, for example, a process executed as part of the transaction, a function applied to the transaction data or any other step of the transaction. The identified data may include the data processed, data input into a function, an identifier of the process/function applied, and the results of the process/function.

The received data is comprised of various data elements. In one embodiment, for each data element, the transaction module 202 applies a hash function to the data element to obtain a hash for the data element. The hash function is a one-way function that makes it infeasible to recover the data element from the data signature. In one embodiment, the hash function applied is an SHA-256 (Secure Hash Algorithm-256) function. In one embodiment, the transaction module 202 stores each data element in the key-value database 210 using the hash of the data element as the key. The same key can be used to retrieve the data element from the key-value database 210.

In one embodiment, the transaction module 202 applies a Merkle tree hashing algorithm to the hashes of the data elements to create an event signature for the event. The root node of the Merkle tree is the event signature for the event. Since the event signature is created using the data of the event, the event signature is unique to the event. The transaction module 202 provides the event signature to the progression module 204 for creating a record for the event. In one embodiment, the transaction module 202 also provides to the progression module 204 any other hashes used to create the event signature (e.g., the hashes of the Merkle tree).

The progression module 204 creates records for events of transactions. When the progression module 204 identifies an event signature created by the transaction module 202 for an event of a transaction, the progression module 204 creates a transaction signature for the event to cryptographically link the event with other events of the transaction. To create the transaction signature, the transaction module 202 searches the progression database 212 for a progression associated with the transaction. The progression database 212 includes the records of each progression stored by the data storage system 108.

If the progression database 212 does not include a progression for the transaction, the transaction module 202 determines to use the event signature as the transaction signature for the event. The progression module 204 creates a genesis record for the event which is the start of a new progression for the transaction. In the genesis record, the progression module 204 includes the event signature/transaction signature. In one embodiment, the progression module 204 also includes in the genesis record other hashes used by the transaction module 202 to create the event signature/transaction signature. Additionally, the progression module 204 includes an identifier of the transaction in the genesis record.

On the other hand, if the progression database 212 includes a progression for the transaction, the progression module 204 retrieves from the progression database 212 the records of the progression. The progression module 204 identifies the transaction signature included in the last record added to the progression. The progression module 204 hashes the identified transaction signature of such last record with the event signature to create the transaction signature for the event associated with the event signature. The progression module 204 adds a new record to the end of the progression and includes the created transaction signature in the new record to cryptographically link the new record to the previous last record of the progression.

For a newly created record of a progression, the progression module 204 determines whether to link the record with records of other progressions corresponding to other transactions. The progression module 204 includes multiple linking rules. Each linking rule describes conditions that when satisfied by an event signify that the record of the event should be linked with records of other progressions. The linking rule further specifies the progressions and records with which to link the record when the conditions are satisfied. In one embodiment, the linking rules are created by system administrators of the data storage system 108. If the event represented by the newly created record satisfies the conditions of a linking rule, the progression module 204 identifies in the progression database 212 one or more records of other progressions with which to link the newly created record according to the linking rule. The progression module 204 links the newly created record with the identified one or more records of other progressions. In one embodiment, the progression module 204 links the newly created record with the identified one or more records of other progressions by including in the newly created record the storage location of each of the one or more records in the progression database 212.

The progression module 204 also determines whether the event of the created record is the last event of the transaction. In one embodiment, the progression module 204 makes the determination based on data received by the transaction module 202 for the event which indicates when it is the last event for the transaction. In another embodiment, the genesis record of the progression includes a description or identifier of the last event for the corresponding transaction. If the event of the created record satisfies the description or is associated with the identifier included in the genesis record, the progression module 204 determines that the event is the last one of the transaction. Still another way for the progression module 304 to determine if an event or event log is the last event of that particular progression may be by identifying some meta-data present in the event log that is received, such as a time-stamp.

If the event is the last event of the transaction, the progression module 204 labels the created record as an end record. In one embodiment, once the progression module 204 labels a record of a progression as an end record, the progression module 204 will not add additional records to the progression because there should be no additional events for the transaction of the progression. The progression module 204 stores the created end record in the progression database 212.

In one embodiment, events for a particular transaction may be processed across different processing systems 102. In particular, a transaction that begins at one processing system 102 may reach an intermediate state after which a different processing system 102 may resume processing events related to the transaction. In such an embodiment, the progression database 212 stores the records related to the portion of the transaction processed by the processing system 102 that includes the given progression database 212. The remaining records related to the transaction are stored in different progression databases included in the other processing systems 102 that process other portions of the transaction. Details related to such an embodiment are described below in conjunction with FIGS. 5A-7.

The anchor module 206 exports records to the anchor system 110. When the progression module 204 creates a record for an event, the anchor module 206 determines whether the record satisfies export criteria. The export criteria describe when a copy of a created record should be transmitted to the anchor system 110. In one embodiment, the export criteria are established by the system administrators of the data storage system 108. If the record satisfies the export criteria, the anchor module 206 transmits a copy of the record to the anchor system 110 as an export anchor.

In one embodiment, when an export anchor is transmitted to the anchor system 110, the anchor module 206 receives from the anchor system 110 an import anchor created based on the export anchor. Based on receiving the import anchor, the anchor module 206 retrieves from the progression database 212 the records of a progression that includes the record transmitted to the anchor system 110 as an export anchor. The anchor module 206 identifies the transaction signature of the last record added to the progression. The anchor module 206 hashes the transaction signature with the import anchor to create a new transaction signature. The anchor module 206 adds a new record to the progression and includes the created transaction signature in the new record. The anchor module 206 also includes the import anchor in the new record. The anchor module 206 stores the new record in the progression database 212.

In one embodiment, when the import anchor is received, if the progression includes an end record, the anchor module 206 notifies the anchor system 110 that the import anchor cannot be included in the progression because no additional records can be added to the progression. In another embodiment, when the import anchor is received, if the progression includes an end record, the anchor module 206 makes an exception for the import anchor and adds a new record to the progression to include the import anchor. The anchor module 206 labels the new record as an end record.

The audit module 208 processes audit requests from the anchor system 110. When the audit system 104 requests specific records for comparing with anchors, the audit module 208 identifies the records in the progression database 212 and transmits the records to the audit system 104. If the audit system 104 requests records associated with a transaction, the audit module 208 searches the progression database 212 for a genesis record associated with the transaction. When the genesis record associated with the transaction is identified, the audit module 208 retrieves the identified genesis record along with other records that are part of the same progression as the genesis record. The audit module 208 transmits the retrieved records to the audit system 104.

In one embodiment, the audit system 104 is allowed to retrieve data elements stored in the key-value database 210. If a request for a data element is received, the audit module 208 identifies a key included with the request. The audit module 208 uses the key to retrieve the requested data element from the key-value database 210 and transmits the data element to the audit system 104. The audit system 104 may request data elements, for example, to recreate an event of a record. For example, if an event for a transaction included applying a function to data, the data elements stored in the key-value database 210 for the event may include an input provided to a function, an identifier of the function, and the output of the function. The audit system 104 requests the data elements stored by the key-value database 210 to recreate applying the function to the data and verify that the event was performed properly.

Example Progressions for Financial Transaction

FIGS. 3A-3E are examples of how progressions are stored in accordance with one embodiment. As discussed above, a progression is created for each transaction processed by a processing system. A progression created for a transaction represents a timeline of events that occurred and are related to the transaction. Each record in a progression represents an event related to the transaction and captures the state of the transaction when the event occurred.

A particular example of a transaction may be transferring funds from a first account to a second account. The transfer of funds from the first account to the second account may involve events such as validating that the first and second accounts exist, verifying that the user that initiated the transfer is authorized to make the request, determining whether the first account has sufficient funds for the transfer, determining whether the amount of the transfer exceeds an established limit, determining whether the transfer has the characteristics of a money laundering type of transfer, etc. For such a transaction, the corresponding progression includes a record for each of the events mentioned above that occurred for the transaction and the records are cryptographically linked in the order in which the events occurred.

Figure 3A:
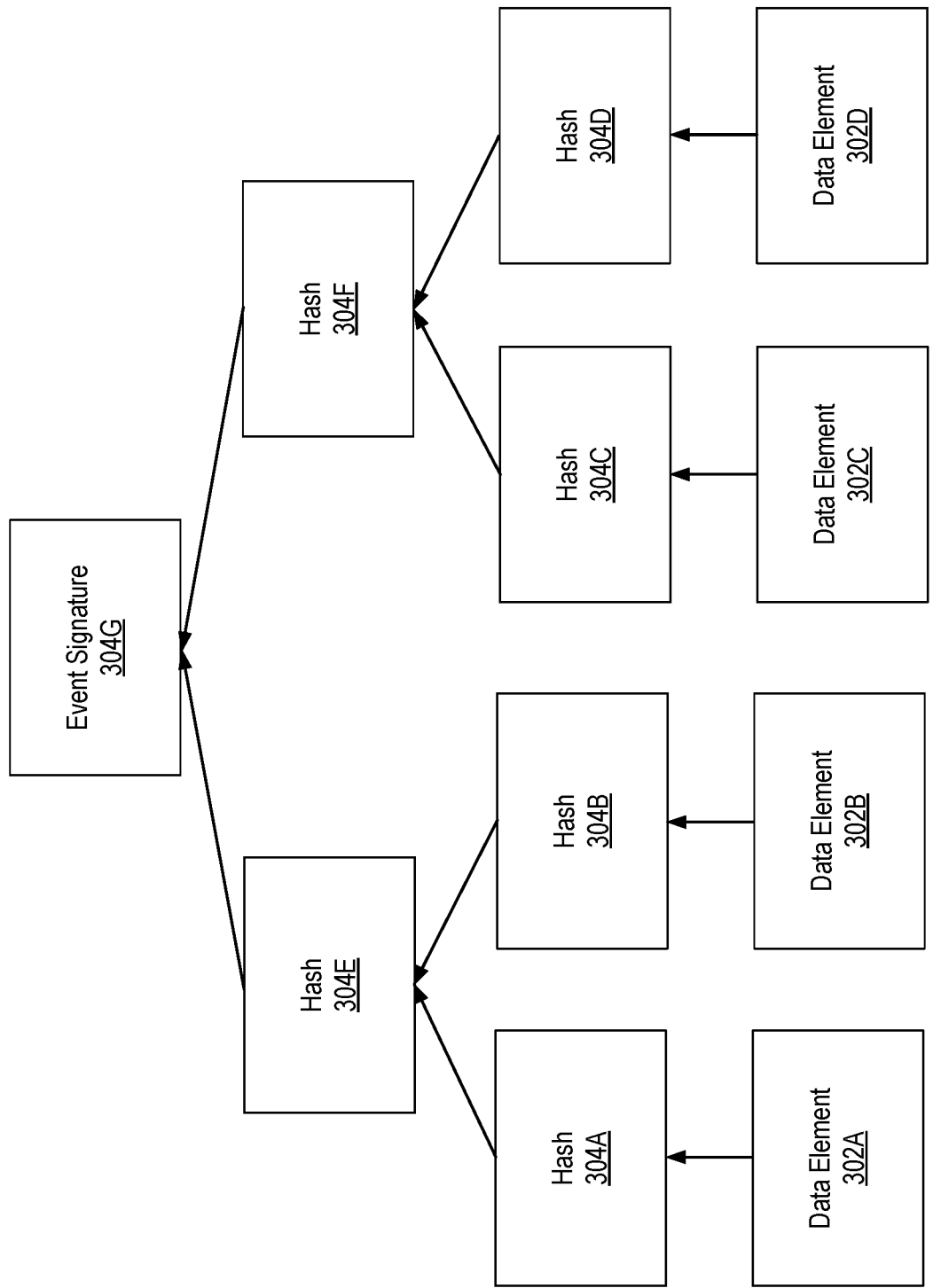
FIGS. 3A-3E are examples of how progressions are stored in accordance with one embodiment.

When an event for a transaction occurs, the data storage system 108 of the processing system 102 identifies data associated with the event. FIG. 3A illustrates the data identified for the event comprised of data elements 302A, 302B, 302C, and 302D. For example, if the transaction is the purchase of stock by a user, the event may be verifying whether the user that initiated the request is authorized to make such a request. In this example, data element 302A may correspond to the date and time when the event occurred, data element 302B corresponds to an identifier of the user, data element 302C corresponds to an identifier (e.g., process ID) of the process executed to verify whether the user is authorized to make the stock purchase request, and data element 302D corresponds to the result of the process (whether the user is authorized to make the stock purchase request).

A hash function is applied to each data element 302A, 302B, 302C, and 302D to create hashes 304A, 304B, 304C, and 304D, respectively. Hash 304A corresponds to data element 302A, hash 304B corresponds to data element 302B, hash 304C corresponds to data element 302C, and hash 304D corresponds to data element 302D. In one embodiment, the data storage system 108 stores each data element 302A-302D in a key-value database using its corresponding hash 304A-304D as the key.

Additionally, the data storage system 108 creates an event signature for the event based on hashes 304A-304D. To create the event signature, the data storage system 108 pairs up the hashes 304A-304D of the data elements and hashes each pair together by applying another hash function to each paired hashes 304A-304D. In this example, hash 304A is paired with hash 304B and another hash function is applied to the paired hashes and the resulting hash is hash 304E. Additionally, hash 304C is paired with hash 304D and another hash function is applied to the paired hashes and the resulting hash is hash 304F. Finally, hashes 304E and 304F are paired and hashed together to get event signature 304G. Event signature 304G is a root hash of a Merkle tree. Hence, the event signature is created by applying a binary Merkle tree hashing algorithm to hashes 304A-304D.

Figure 3B:
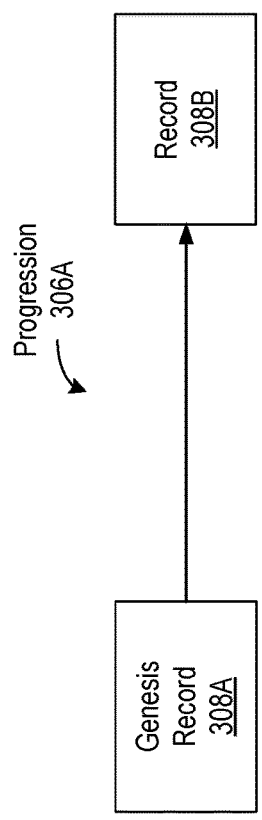

The data storage system 108 searches multiple stored progressions for a progression created for the transaction. Since a different progression exists for each transaction, the data storage system 108 identifies the one progression that corresponds to the transaction. In this example, the data storage system 108 identifies progression 306A which is illustrated by FIG. 3B. The progression 306A already includes genesis record 308A and record 308B, which each represents a different event that has already occurred for the transaction. The genesis record 308A is the first record in the progression 306A and represents the first event that occurred for the transaction. Record 308B represents the second event that occurred for the transaction. In one embodiment, genesis record 308A and record 308B each includes an event signature created from hashing together the data of the corresponding event represented by the record 308 (e.g., using a Merkle tree hashing algorithm as in FIG. 3A). Further, records 308A and 308B are cryptographically linked by record 308B including a transaction signature created by hashing the event signature of the event represented by record 308B with transaction signature of the genesis record 308A. Since genesis record 308A is the first record 308 in the progression, the transaction signature of genesis record 308A is the event signature created for the corresponding event of the record 308A.

Figure 3C:
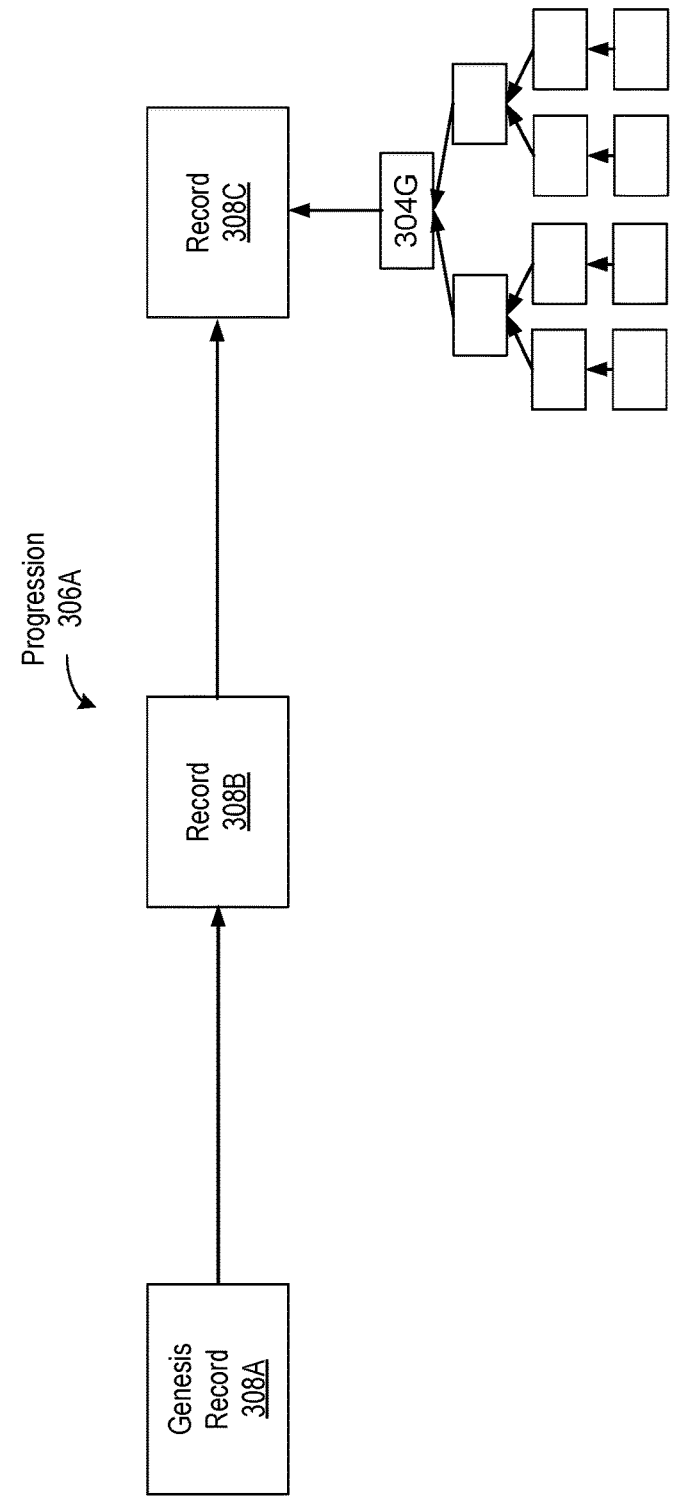

FIG. 3C illustrates that for the event for which event signature 304G is created in FIG. 3A, the data storage system 108 adds record 308C to the progression 306A since it is the next event of the transaction. The data storage system 108 creates a transaction signature for the event by hashing event signature 304G with the transaction signature included in record 308B. The data storage system 108 includes the created transaction signature in record 308C. As a result, the transaction signature cryptographically links record 308C to record 308B. In one embodiment, the data storage system 108 additionally includes in the record 308C hashes 304A-304F and the event signature 304G.

Hence, the data storage system 108 adds record 308C to the progression 306A of the transaction in order to capture the state of the transaction when the corresponding event occurred. Since progression 306A only includes records 308 for events related to the transaction and the records 308 are chronologically linked, the records 308 represent the timeline of events that have occurred related to the transaction. As a result, a progression is created for a single transaction and captures the event information for the transaction.

Figure 3D:
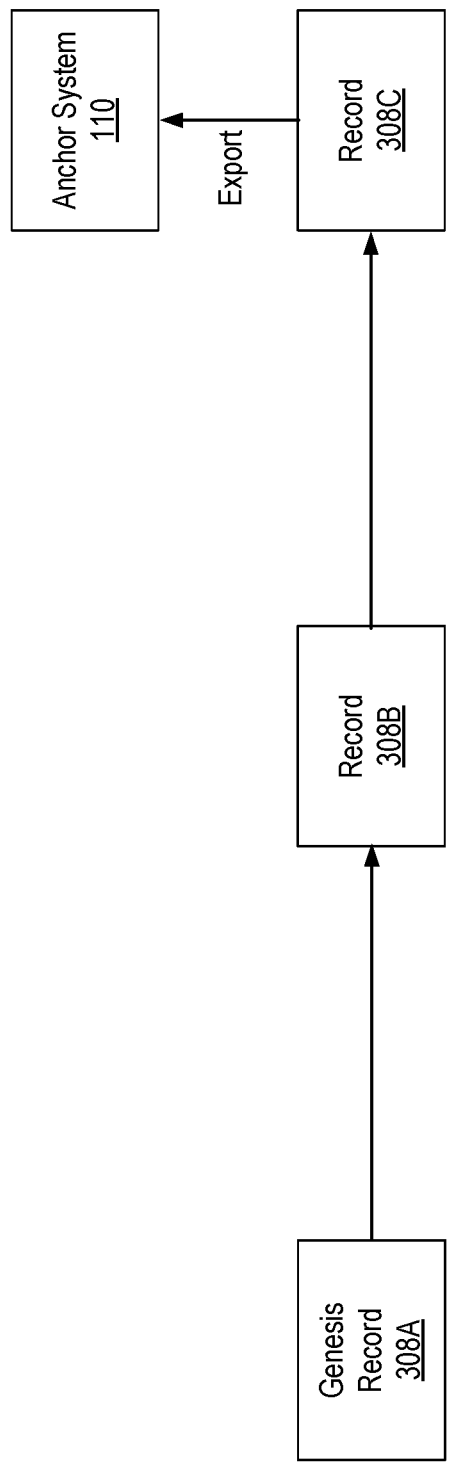

As illustrated in FIG. 3D, in this example, a copy of record 308C is exported by the data storage system 108 to an anchor system 110 for storage. The record is exported to the anchor system 110 based on the record 308C satisfying export criteria. Export criteria describe when a copy of a created record should be transmitted to the anchor system 110. For example, the export criteria may indicate that every other record added to a progression is exported to the anchor system 110 or that records created for specific events be exported to the anchor system 110. The anchor system 110 is separate from the data storage system 108 and maintains its own copies of records stored by the data storage system 108. The copies of records received from the data storage system 108 and stored by the anchor system 110 are referred to as export anchors.

The data stored by the data storage system 108 is intended to be immutable. An audit system uses the export anchors stored by the anchor system 110 to verify that the data stored by the data storage system 108 has not been modified. During an audit, the audit system will compare one or more export anchors stored by the anchor system 110 with corresponding records of the data storage system 108. If an export anchor does not match its corresponding record, the audit system determines that data stored by the data storage system 108 has been tampered with and modified, for example, by an unauthorized malicious entity. For example, returning to FIG. 3A, if the transaction signature included in the export anchor does not match with the transaction signature included in the identified record, the audit system 104 can compare hash 304E of the identified record to the corresponding hash included in the export anchor and also compare hash 304F with its corresponding hash. If hash 304E does not match the corresponding hash, the audit system 104 determines that data elements 302A and/or data element 302B were modified. Further, the audit system 104 can compare hashes 304A and 304B in the identified record with the corresponding hashes of the export anchor. If hash 304A does not match its corresponding hash, the audit system 104 determines that data element 302A has been modified. The audit system 104 can verify that data element 302 has been modified, by retrieving the stored data element 302A using as a key the hash included in the export anchor that corresponds to hash 304A. The same hash function used to create hash 304A is applied to the retrieved data element 302A. If the result of applying the hash function does not match the hash included in the export anchor, the audit system 104 determines that data element 302A has been modified. Similarly if hash 304B does not match its corresponding hash in the export anchor, the audit system 104 determines that data element 302B has been modified.

Figure 3E:
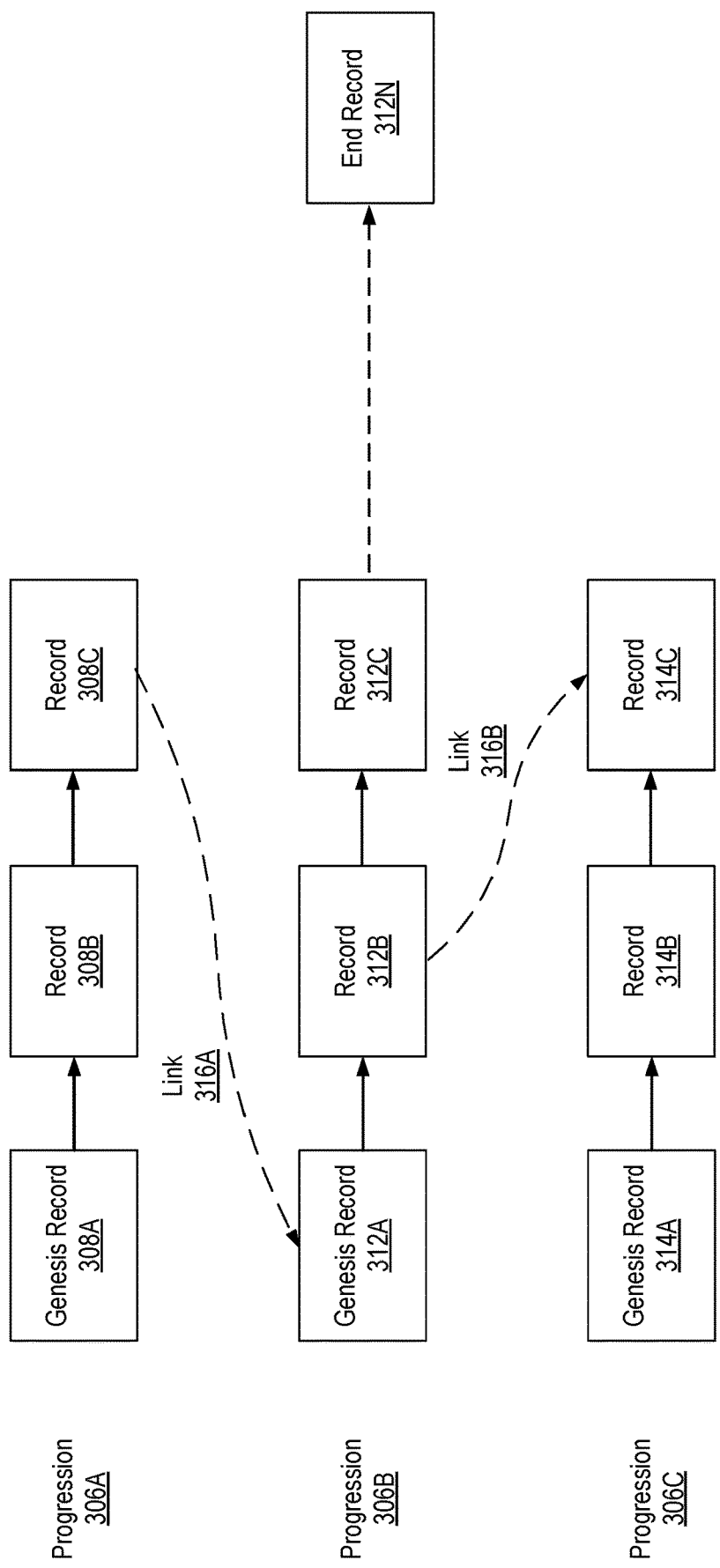

FIG. 3E illustrates progressions 306B and 306C in addition to progression 306A. Progressions 306B and 306C each represents events that have occurred for a corresponding transaction. The transaction of progression 306B and the transaction of progression 306C are each different from the transaction of progression 306A and from each other. For example, progression 306A may represent events that have occurred for a transaction to transfer funds from a first account to a second account, progression 306B represents events that have occurred for a transaction to transfer funds from the first account to a third account, and progression 306C represents events that have occurred for a transaction to purchase stock.

Progression 306B includes genesis record 312A and records 312B through 312N. Progression 306C includes genesis record 314A, record 314B, and record 314C. Record 312N of progression 306B is labeled as an end record because the event represented by end record 312N is the last event of the transaction corresponding to progression 306B. Hence, for the last event of a transaction, the record created for the event is labeled as an end record. In one embodiment, no additional records can be added to a progression after an end record is created. Since progressions 306A and 306C do not include an end record, it signifies that the last event of the corresponding transactions has not yet occurred and additional records will be added to the progressions 306A and 306C.

Continuing with the example from above where progression 306B represents events that have occurred for a transaction to transfer funds from the first account to a third account, assume that the last event of the transaction is to provide a receipt to the user that initiated the request indicating that the funds have been transferred to the third account. When the event occurs, the data storage system 108 creates record 312N. Since record 312N represents the last event of the transaction, the data storage system 108 labels record 312N as an end record.

FIG. 3E further illustrates a link 316A between record 308C of progression 306A and genesis record 312A of progression 306B. FIG. 3E illustrates an additional link 316B between record 312B of progression 306B and record 314C of progression 306C. A link 316 between two progressions 306 is used to show a relationship between the corresponding transactions. When the data storage system 108 adds a record to a progression 306, the data storage system 108 determines whether the event represented by the record satisfies a linking rule. A linking rule describes conditions that, when satisfied by an event, signify that the record created for the event should be linked with one or more additional progressions to show the relationship between the corresponding transactions. If the event represented by the record satisfies a linking rule, the data storage system 108 links the record with another record specified or described by the rule. The data storage system 108 links the record with the other record by including in the record the storage location of the other record.

Hence, in FIG. 3E, record 308C is linked to genesis record 312A based on the event of record 308C satisfying a linking rule. Similarly record 312B is linked to record 314C based on the event of record 312B satisfying another linking rule. For example, in Progression 306A, events that represent a transaction between individuals X and Y in USD (U.S. Dollars) may be recorded. In Progression 306B, events that represent a transaction between individuals X and Z in USD may be recorded. In Progression 306C, all transactions executed by Bank K in USD may be recorded. The linkages represent common elements in these progressions 306A, 306B, 306C. Link 316A may record the linkage that events recorded in Progression 306A and 306B have in common, i.e., the common sender X. The specific events (records, 308C and 312A) linked have the common component that refers to sender X. In Link 316B, the events recorded in Progression 306B and 306C may have USD as the common payment currency.

Although the data storage system 108 is described herein as having a different progression for each transaction, the data storage system 108 may also store progressions for other entities or objects. For example, record 312B may be created when a process is executed as part of the transaction of progression 306B and record 312B is linked with record 314C because progression 306C represents the instructions of the process. Records 314A, 314B, and 314C may each represent a different set of instructions of the process. As another example, progression 306C may be created for a user and records 314A, 314B, and 314C represent different transactions related to the user.

Progression Creation and Processing Flow

Figure 4A:
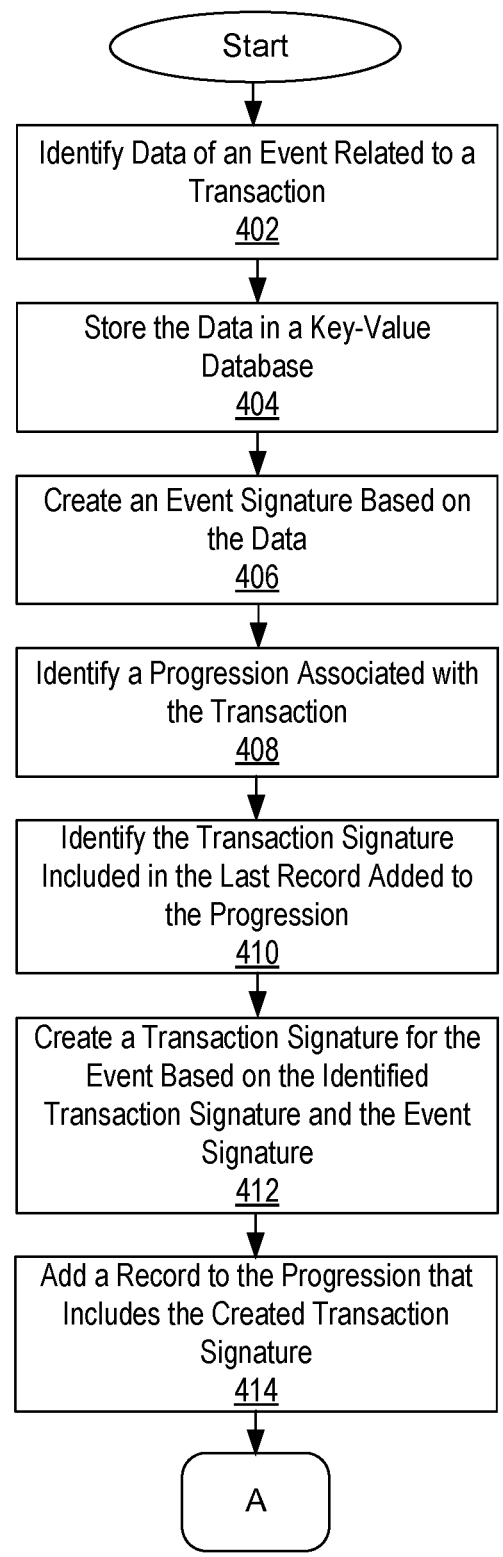
FIGS. 4A and 4B illustrate a flowchart of a process for storing data of an event related to a transaction in accordance with one embodiment.
Figure 4B:
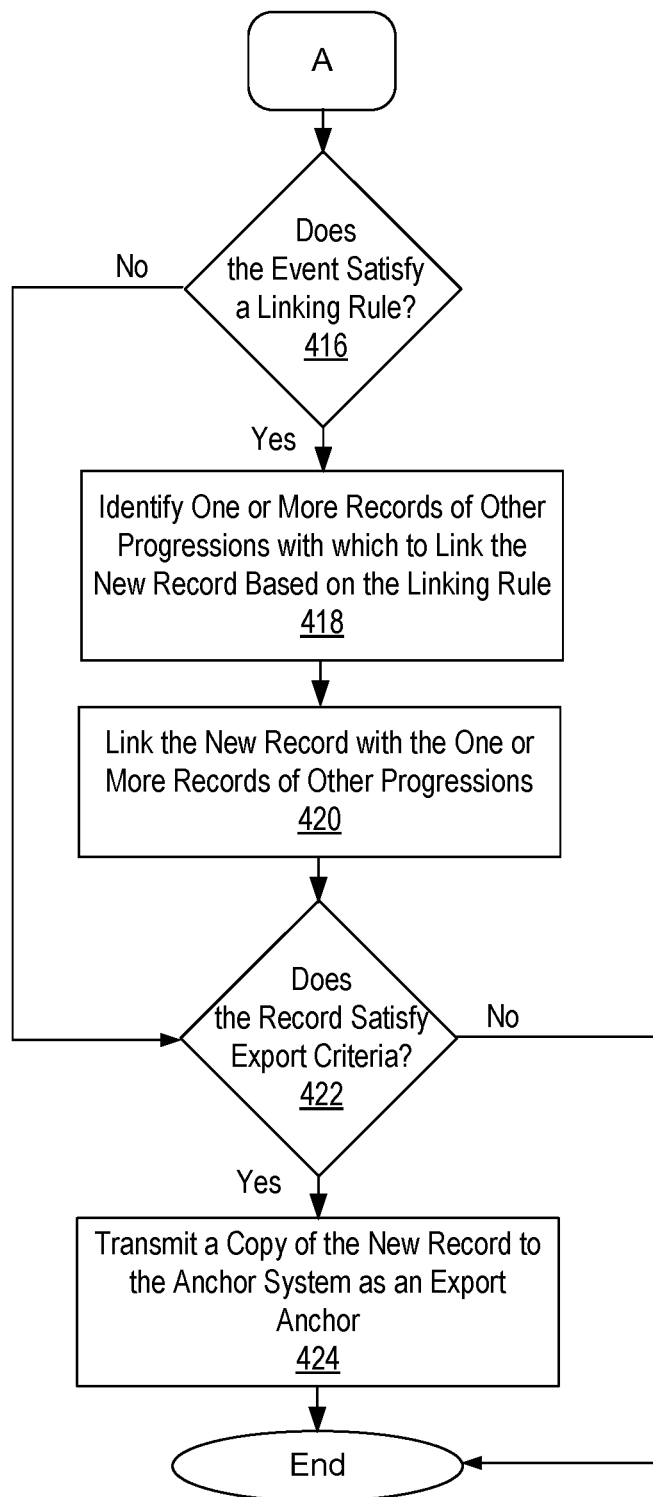

FIGS. 4A and 4B illustrate a flowchart of a process for storing data of an event related to a transaction in accordance with one embodiment. Those of skill in the art will recognize that other embodiments can perform the steps described in FIGS. 4A and 4B in different order. Moreover, other embodiments can include different and/or additional steps than the ones described.

The process starts on FIG. 4A with the data storage system 108 identifying 402 data of an event related to a transaction. The data storage system 108 stores 404 the data in the key-value database 210. The data storage system 108 further creates 406 an event signature for the event based on the data as illustrated in FIG. 3A. The data storage system 108 identifies 408 a progression created for the transaction as illustrated in FIGS. 3B and 3C. The data storage system 108 identifies 410 the transaction signature included in the last record added to the progression. The data storage system 108 creates 412 a transaction signature for the event based on hashing the identified transaction signature and the event signature created for the event. The data storage 108 adds 414 a record to the progression that includes the created transaction signature.

Continuing onto FIG. 4B, the data storage system 108 determines 416 whether the event satisfies a linking rule. If the data storage system 108 does not satisfy a linking rule, the process skips to step 422. On the other hand, if the event does satisfy a linking rule, the data storage system 108 identifies 418 one or more records of other progressions with which to link the newly added record. The data storage system 108 determines based on the linking rule the records with which to link the new record. The data storage system 108 links 420 the new record with the identified one or more records of other progressions and proceeds to step 422.

At step 422, the data storage system 108 determines whether the new record satisfies export criteria. If the new record does not satisfy the export criteria, the process ends. However, if the new record satisfies the export criteria, the data storage system 108 transmits 424 a copy of the new record to the anchor system 110 as an export anchor prior to the process ending.

Segmented Progressions

Events for a particular transaction may be processed across different processing systems 102. In particular, a transaction that begins at one processing system 102 may reach an intermediate state after which a different processing system 102 may resume processing events related to the transaction. The transaction may continue to transition through various intermediate states until the transaction reaches a terminal state. At each intermediate state, the processing system 102 that was processing events related to the transaction may hand off processing subsequent events to a new processing system 102.

A progression for a transaction that is processed across multiple processing systems 102 is organized as a chronological chain of segments. Such a progression is referred to herein as a "segmented progression." Each segment in the segmented progression includes records for events processed by a given processing system 102 prior to the transaction reaching an intermediate state or a terminal state. In operation, the first segment of a segmented progression includes records for events processed by a processing system 102 from when the transaction began to when the transaction reached a first intermediate state. Each subsequent segment of the segmented progression includes records for events processed by a processing system 102 until the transaction reaches a new intermediate state or a terminal state. When the transaction reaches a terminal state, the segmented progression includes records associated with all of the events that occurred in relation to the transaction across multiple processing systems 102.

As discussed above, each record of a progression has a transaction signature that links the record to a previous record of the progression. As such, the transaction signature of a record is a cryptographic hash of the event signature associated with the record and a transaction signature included in the last record added to the progression. In the case of a segmented progression, the transaction signature for the first record in a segment is cryptographically linked to the last record in a previous segment, if any. To link records across segments, when a transaction reaches an intermediate state at a given processing system 102, the progression module 204 of the processing system 102 creates a linking object based on the last record of the current segment. The linking object includes a cryptographic hash of the transaction signature included in the last record added to the segment. The linking object also includes metadata that identifies the specific transaction and the date and time of when the linking object was created. In certain embodiments, the linking object may include industry-specific information such as anti-money laundering checks for financial transactions. The processing system 102 transmits the linking object transmitted to one or more other processing systems 102 that will resume processing of the transaction. The linking object enables the processing systems 102 that will resume processing of the transaction to generate other segments of the progression based on the transaction signature included in the linking object.

When the processing of the transaction resumes at a different processing system 102 (referred to as the recipient processing system 102), the progression module 204 of the recipient processing system 102 creates a new segment for the progression associated with the transaction. The new segment stores records related to events generated at the recipient processing system 102. For the first record in the new segment, the progression module 204 of the recipient processing system 102 generates a transaction signature using a cryptographic hash of the event signature associated with the record and the transaction signature included in the linking record. For subsequent records in the new segment, the transaction signatures for those records are determined using the same mechanism as that described above. In particular, the progression module 204 identifies the transaction signature included in the immediately prior record added to the segment. The progression module 204 hashes the identified transaction signature of such an immediately prior record with the event signature for the current event to create the transaction signature for the event. The progression module 204 then adds a new record to the end of the segment and includes the newly created transaction signature in the new record to cryptographically link the new record to the immediately prior record of the segment.

In such a manner, a segmented progression includes records associated with all of the events that occurred in relation to the transaction across multiple processing systems 102. In one embodiment, the different segments of the segmented progression are stored in the progression databases 212 of the respective processing systems 102. For each subsequent segment after the first segment of the segmented progression, the progression database 212 of the processing system 102 that created the segment also stores the linking object that chronologically links the segment to the immediately prior segment of the segmented progression. Thus, even though the event data for a segmented progression is stored across multiple processing systems 102, the relationship across the different segments is maintained via the linking objects.

Figure 5A:
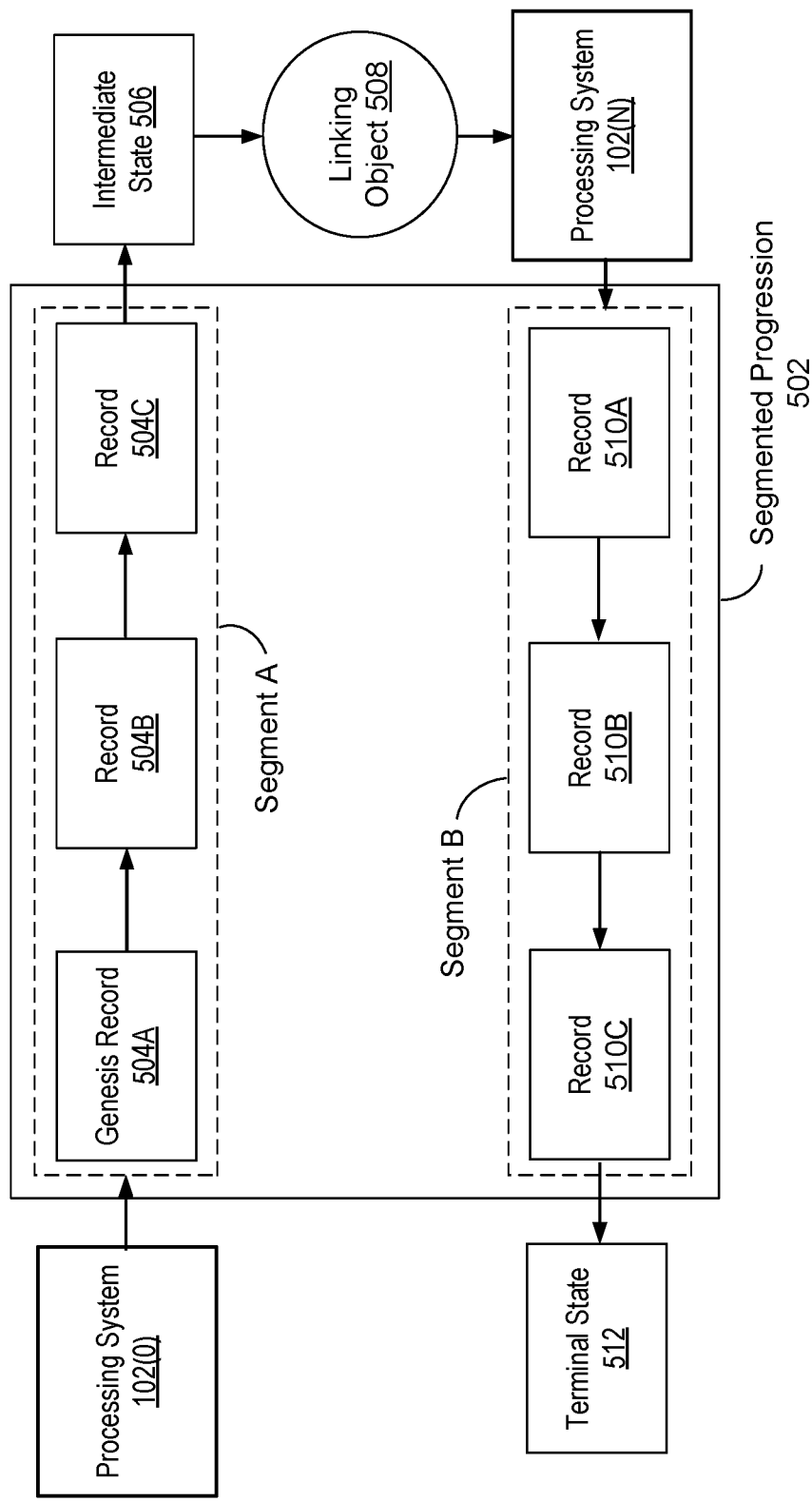
FIGS. 5A and 5B illustrate an exemplary segmented progression associated with a transaction processed across two processing systems in accordance with one embodiment.
Figure 5B:
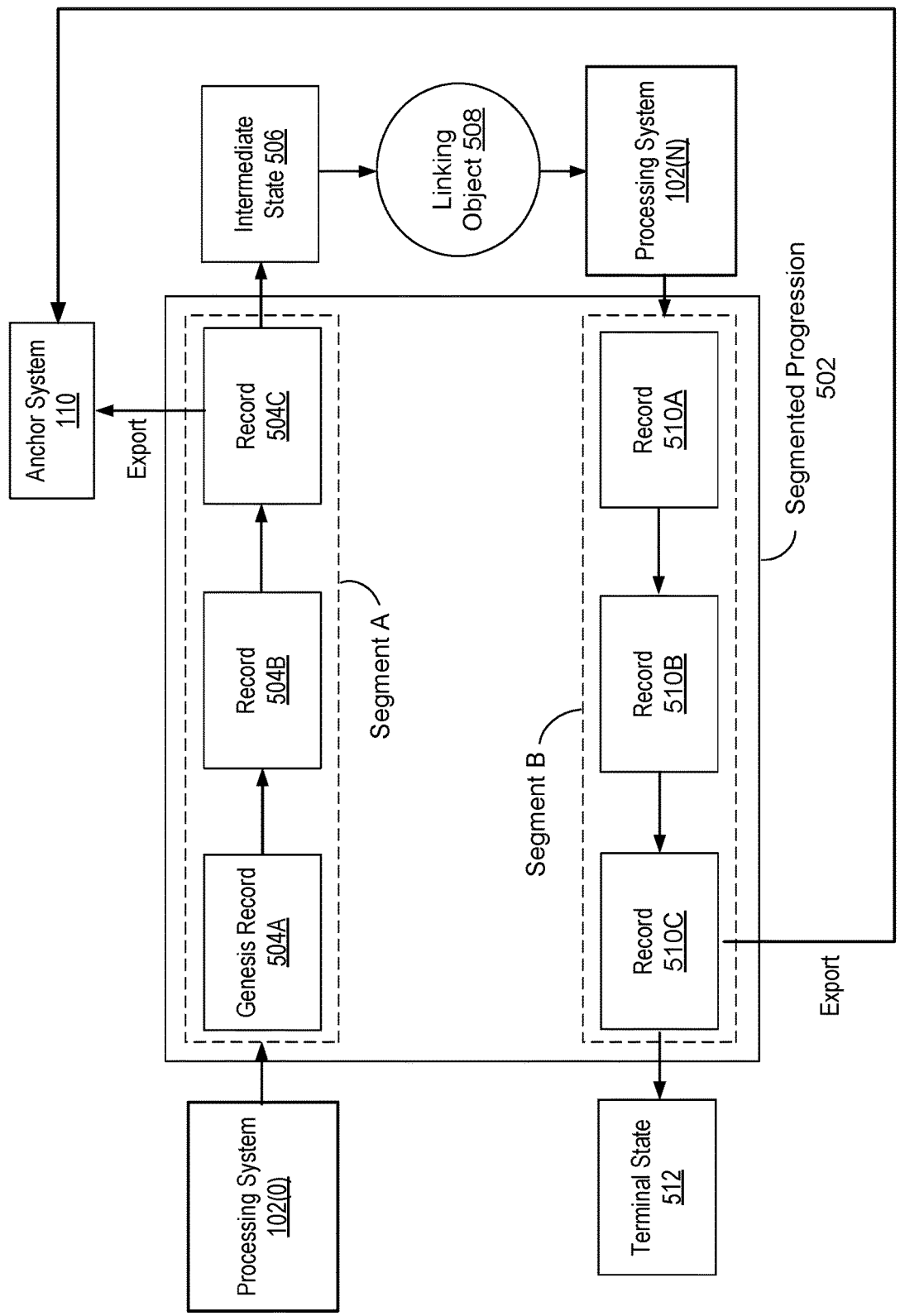

FIGS. 5A and 5B illustrate an exemplary segmented progression 502 associated with a transaction processed across processing system 102(0) and processing system 102(N) in accordance with one embodiment. The processing system 102(0) begins processing the transaction. The progression module 204 of the processing system 102(0) creates segment A for storing records associated with events processed by the processing system 102(0) in relation to the transaction. Segment A and the records included therein are stored in the progression database 212 of the processing system 102(0).

For the first processed event, the progression module 204 creates a genesis record 504A for the event. The genesis record 504A indicates the start of the segmented progression 502 and includes the event signature for the event, the transaction signature for the event, and identifier of the transaction. For the second and third events processed by the processing system 102(0), the progression module 204 creates record 504B and 504C, respectively. The progression module 204 determines the transaction signature of the record 504B based on the transaction signature of the genesis record 504A. Similarly, the progression module 204 determines the transaction signature of the record 504C based on the transaction signature of the record 504B.

After the event associated with record 504C is processed, the transaction reaches an intermediate state 506. As an example, an intermediate state in a financial transaction may be the completion of execution of a fraud detection algorithm on the payment transaction. Similarly, another example of an intermediate state in a financial transaction may be the completion of Anti-Money Laundering verification on the payment transaction. These two independent steps will need to be linked together cryptographically to provide evidence that both steps were taken on the same payment transaction. The intermediate state 506 signifies that further processing of the transaction may occur within a different processing system 102. Once the transaction reaches the intermediate state 506, the progression module 204 creates the linking object 508 associated with segment A. The linking object 508 includes the transaction identifier associated with the transaction and the transaction signature of the record 504C. In some embodiments, the linking object 508 includes a cryptographic hash of the transaction signature of the record 504C instead.

In the example illustrated in FIG. 5A, the processing system 102(N) resumes processing of the transaction after intermediate state 506. Consequently, the processing system 102(0) transmits the linking object 508 to the processing system 102(N). The progression module 204 of the processing system 102(N) creates segment B for storing records associated with events processed by the processing system 102(N) in relation to the transaction. Segment B and the records included therein are stored in the progression database 212 of the processing system 102(N).

For the first processed event, the progression module 204 creates a record 510A that includes a transaction signature. The progression module 204 determines the transaction signature of record 510A based on the transaction signature included in the linking object 508. In particular, the progression module 204 hashes the transaction signature included in the linking object 508 with the event signature associated with the first event processed by the processing system 102(N). For the second and third events processed by the processing system 102(N) in relation to the transaction, the progression module 204 creates record 510B and 510C, respectively. The progression module 204 determines the transaction signature of the record 510B based on the transaction signature of the genesis record 510A of segment B. Similarly, the progression module 204 determines the transaction signature of the record 510C based on the transaction signature of the record 510B.

After the event associated with record 510C is processed, the transaction reaches a terminal state 512. The terminal state indicates that the transaction is complete such that no more events related to the transaction are going to be processed and, consequently, no more records need to be added to the segmented progression. At this stage, the segmented progression 502 includes all of the records associated with the transaction. Segment A, storing records for events processed by processing system 102(0), is stored in the progression database 212 of the processing system 102(0). On the other hand, segment B, storing records for events processed by the processing system 102(N), is stored in the progression database 212 of the processing system 102(N) in conjunction with the linking object 508. In one embodiment, the linking object 508 is stored as part of the record 510A. In alternative embodiments, the linking object 508 is stored in association with segment B but separately from the records therein.

As discussed above, records in progression are exported to anchor systems, such as the anchor system 110, so that the integrity of the data stored in the data storage systems 108 can be verified. Records in segmented progressions are anchored in a similar fashion. As illustrated in FIG. 5B, in this example a copy of record 504C and a copy of record 510C are exported to the anchor system 110 for storage. The records are exported to the anchor system 110 based on the records 504C and 510C satisfying export criteria. In alternative embodiments, the records are exported to two or more different anchor systems.

As discussed above, export criteria describe when a copy of a created record should be transmitted to the anchor system 110. For example, the export criteria may indicate that every other record added to a progression is exported to the anchor system 110 or that records created for specific events be exported to the anchor system 110. The anchor system 110 is separate from the processing system 102(0) and the processing system 102(N) and maintains its own copies of records stored by the processing system 102(0) and the processing system 102(N). These copies of records stored by the anchor system 110 are referred to as export anchors.

Along with the export anchors, the anchor system 110 stores the transaction identifier associated with the transaction being processed. The anchor system 110 may optionally store the identity of the particular processing system 102 from which a given export anchor was received. For example, the anchor system 110 may store the identity of processing system 102(0) in conjunction with the export anchor associated with record 504C of segment A of the segmented progression and the identity of processing system 102(N) with the export anchor associated with record 510C of segment B of the segmented progression.

The audit system 104 uses the export anchors stored by the anchor system 110 to verify that the data stored by the different processing systems 102 in relation to the segmented progression 502 has not been modified. During an audit, the audit system 104 will compare one or more export anchors stored by the anchor system 110 with corresponding records stored across the different processing systems 102 of the multiple segments of the segmented progression. If an export anchor does not match its corresponding record, then the audit system 104 determines that data stored by the data storage system 108 has been tampered with and modified, for example, by an unauthorized malicious entity.

Figure 6A:
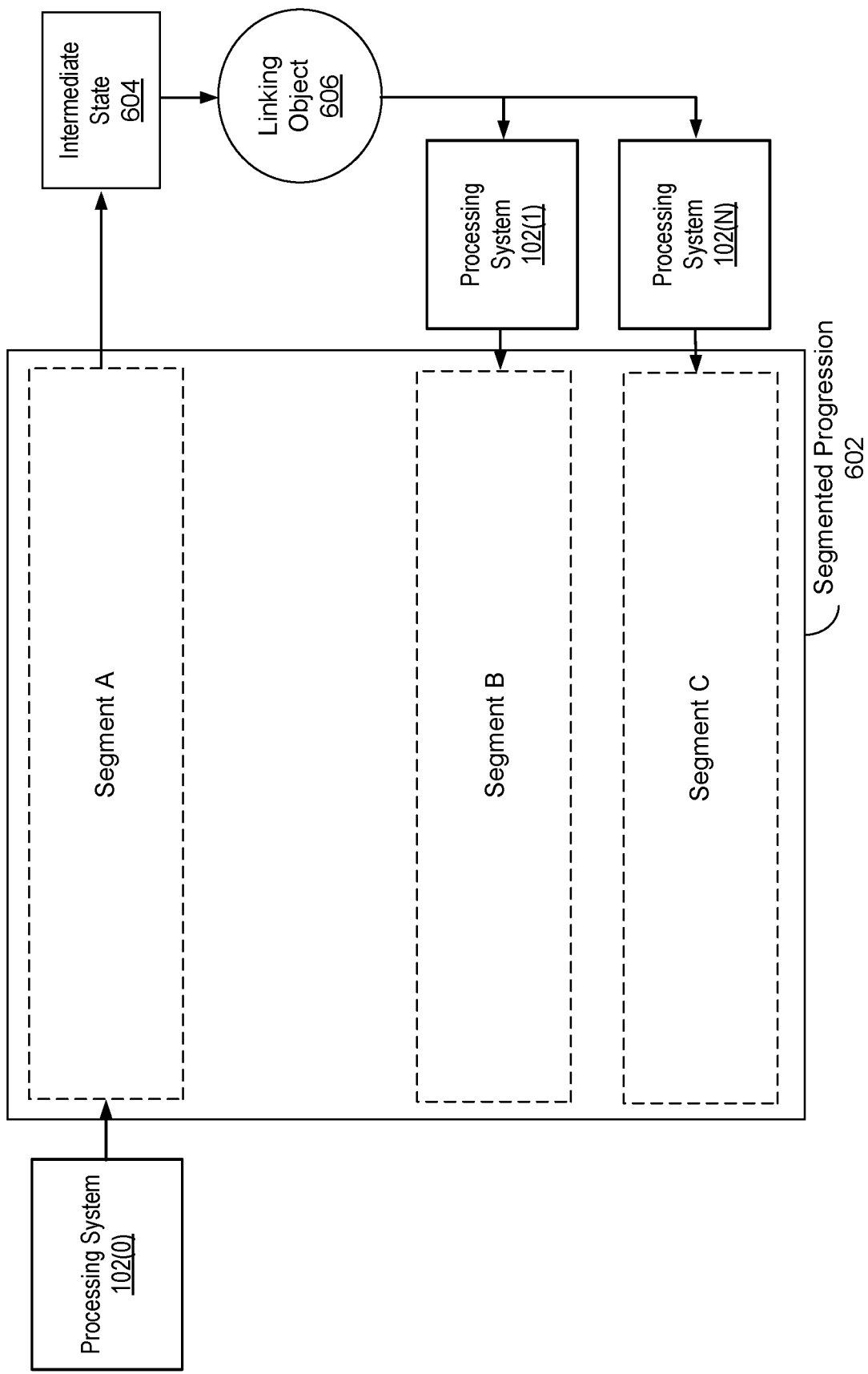
FIGS. 6A-6C illustrate exemplary segmented progressions associated with a transaction that is processed across various combinations of the processing systems in accordance with one embodiment.
Figure 6B:
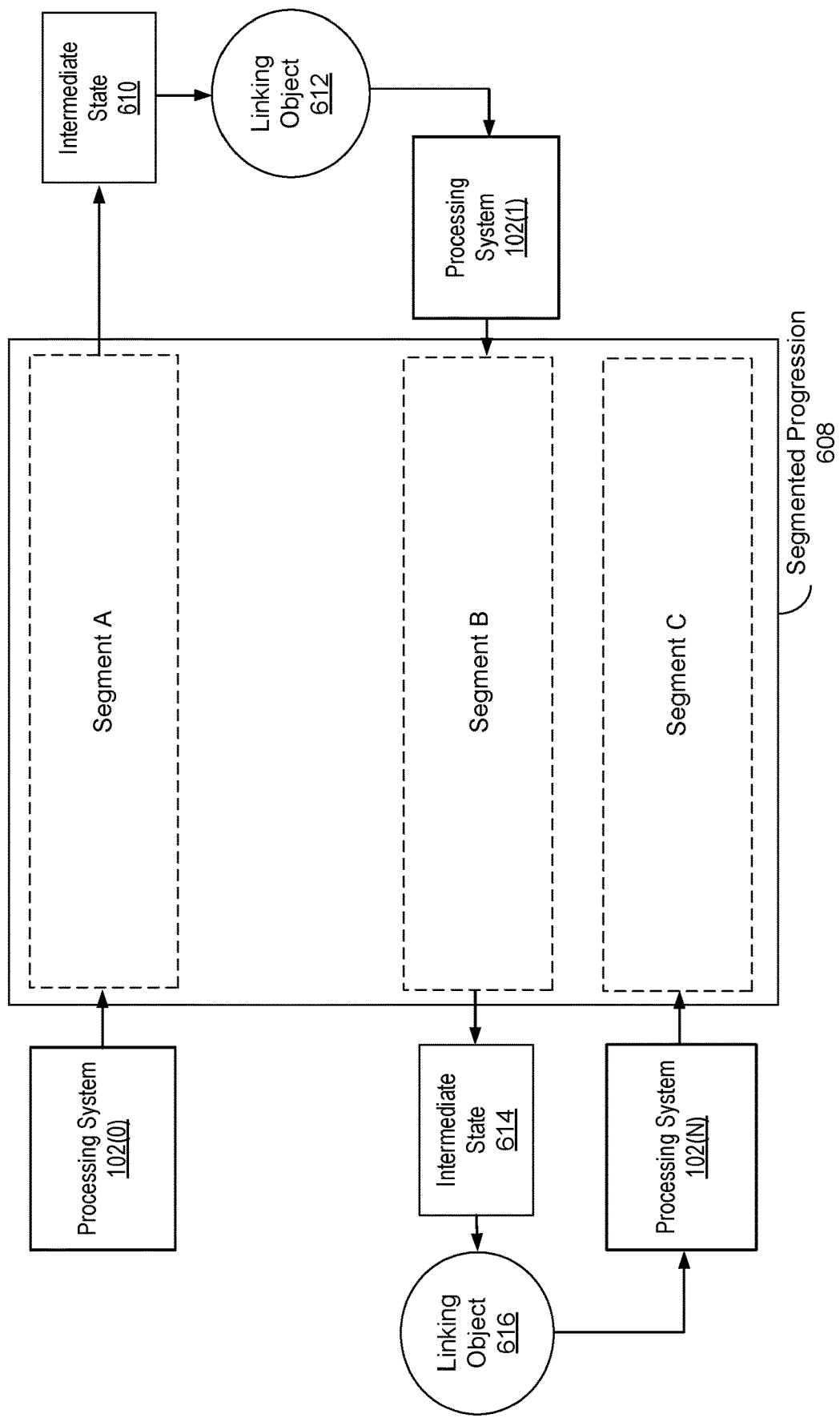
Figure 6C:
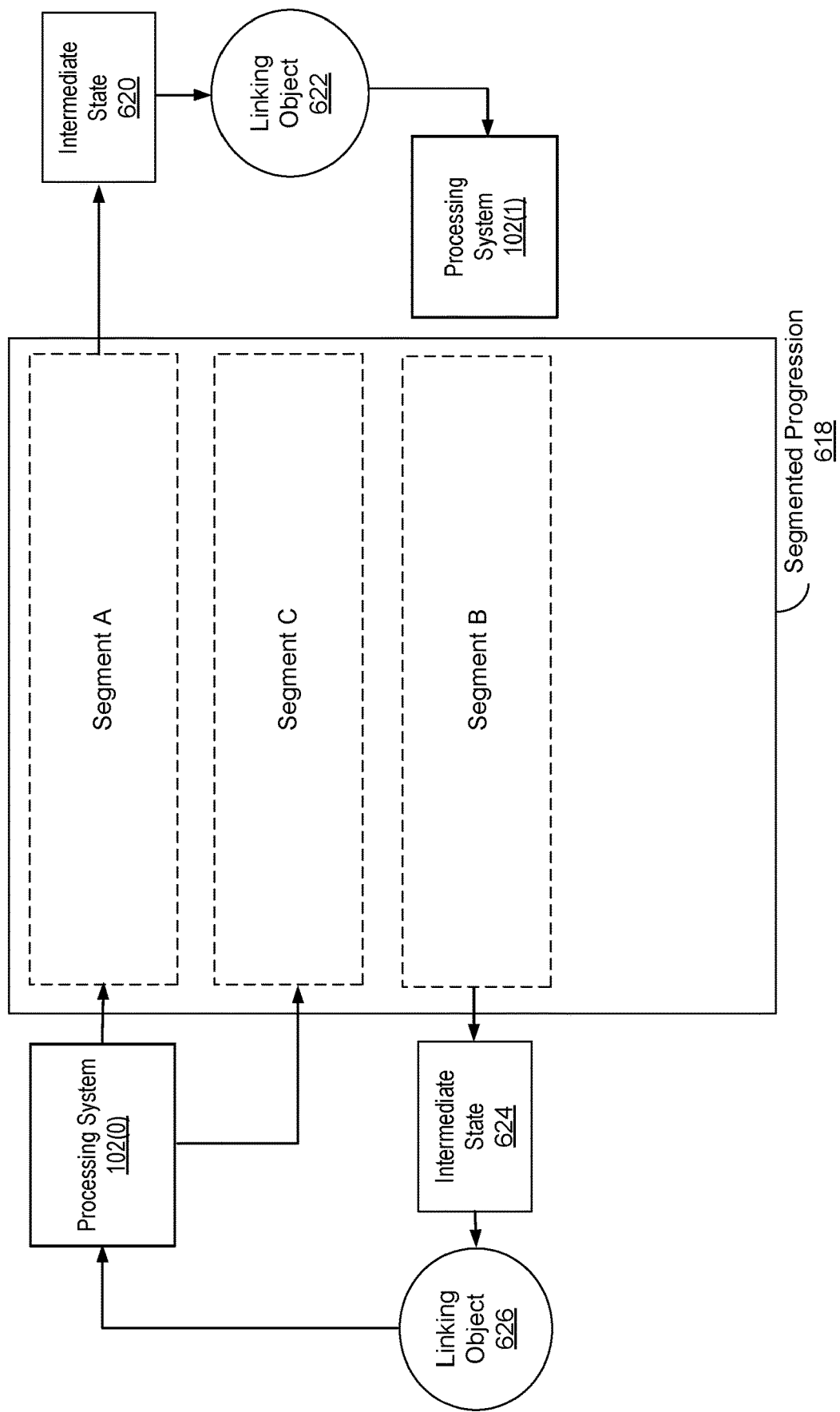

Events related to a segmented progression may be processed across more than two processing systems 102. FIGS. 6A-6C illustrate exemplary segmented progressions associated with a transaction that is processed across various combinations of the processing systems 102 in accordance with one embodiment. In particular, FIG. 6A illustrates an exemplary segmented progression 602 associated with a transaction that is processed across processing system 102(0), processing system 102(1), and processing system 102(N). Records for events related to the transaction processed by processing system 102(0) prior to the transaction reaching intermediate state 604 are stored in segment A of the segmented progression 602. After the intermediate state, processing of the transaction resumes at both processing system 102(1) and processing system 102(N). Therefore, the processing system 102(0) transmits the linking object 606 storing the transaction signature of the last record in segment A to both the processing system 102(1) and the processing system 102(N). The processing system 102(1) resumes processing of the transaction and stores records related to the resulting events in segment B of the segmented progression 602. Similarly, the processing system 102(N) resumes processing of the transaction and stores records related to the resulting events in segment C of the segmented progression 602. The transaction signature of the first records in segments B and C is determined based on the transaction signature included in the linking object 606. Since the underlying system creates graph linkages across event logs stored in progressions, progressions may be split in parallel across two or more different downstream processing elements as described above.

FIG. 6B illustrates an exemplary segmented progression 608 associated with a transaction that is processed across processing system 102(0), processing system 102(1), and processing system 102(N). Records for events related to the transaction processed by processing system 102(0) prior to the transaction reaching intermediate state 610 are stored in segment A of the segmented progression 608. After the intermediate state 610, processing of the transaction resumes at processing system 102(1). Therefore, the processing system 102(0) transmits the linking object 612 storing the transaction signature of the last record in segment A to the processing system 102(1). The processing system 102(1) resumes processing of the transaction and stores records related to the resulting events in segment B of the segmented progression 602 until the transaction reaches intermediate state 614. The transaction signature of the first records in segment B is determined based on the transaction signature included in the linking object 616. After the intermediate state 614, processing of the transaction resumes at processing system 102(N). Therefore, the processing system 102(1) transmits the linking object 616 storing the transaction signature of the last record in segment B to the processing system 102(N). The processing system 102(N) resumes processing of the transaction and stores records related to the resulting events in segment C of the segmented progression 602. The transaction signature of the first records in segment C is determined based on the transaction signature included in the linking object 616.

FIG. 6C illustrates an exemplary segmented progression 618 associated with a transaction that is processed across processing system 102(0) and processing system 102(1). Records for events related to the transaction processed by processing system 102(0) prior to the transaction reaching intermediate state 620 are stored in segment A of the segmented progression 618. After the intermediate state 620, processing of the transaction resumes at processing system 102(1). Therefore, the processing system 102(0) transmits the linking object 622 storing the transaction signature of the last record in segment A to the processing system 102(1). The processing system 102(1) resumes processing of the transaction and stores records related to the resulting events in segment B of the segmented progression 618 until the transaction reaches intermediate state 624. The transaction signature of the first records in segment B is determined based on the transaction signature included in the linking object 622. After the intermediate state 624, processing of the transaction resumes back at processing system 102(0). Therefore, the processing system 102(1) transmits the linking object 626 storing the transaction signature of the last record in segment B to the processing system 102(N). The processing system 102(0) resumes processing of the transaction and stores records related to the resulting events in segment C of the segmented progression 618. The transaction signature of the first records in segment C is determined based on the transaction signature included in the linking object 626.

Figure 7:
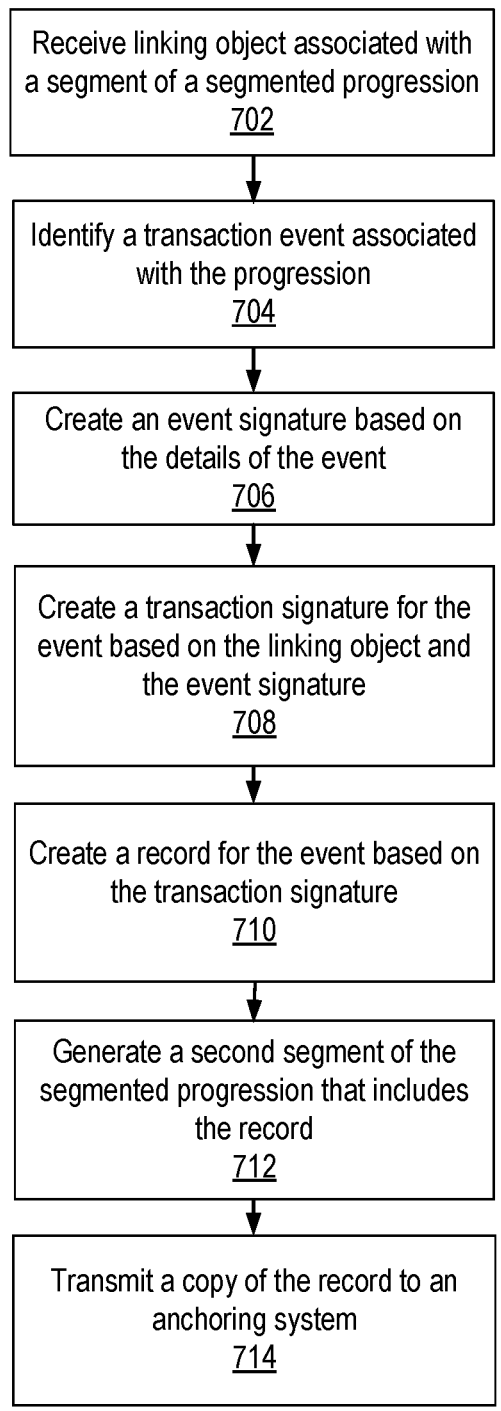
FIG. 7 illustrates a flowchart of a process for storing data of an event related to a transaction being processed across multiple processing systems in accordance with one embodiment.

FIG. 7 illustrates a flowchart of a process for storing data of an event related to a transaction being processed across multiple processing systems in accordance with one embodiment. Those of skill in the art will recognize that other embodiments can perform the steps described in FIG. 7 in a different order. Moreover, other embodiments can include different and/or additional steps than the ones described.

The process starts on FIG. 7 with a recipient processing system 102 receiving 702 a linking object associated with a prior segment of a segmented progression stored within a transmitting processing system 102. The segmented progression is associated with a transaction being processed across multiple processing systems 102 including the recipient and the transmitting processing systems 102. The linking object includes the transaction signature of the last record in the prior segment and a transaction identifier associated with the segmented progression. In one embodiment, the transmitting processing system 102 also transmits the last record in the segment to an anchoring system as an export anchor.

The recipient processing system 102 identifies 704 a new event that was processed in relation to the transaction associated with the segmented progression. The recipient processing system 102 creates 706 an event signature for the event based on one or more details of the event. The recipient processing system 102 creates 708 a transaction signature for the event based on the event signature created at step 706 and the transaction signature included in the linking object received at step 702. The recipient processing system 102 then creates 710 a record for the event based on the transaction signature. The recipient processing system 102 generates 712 a second segment of the segmented progression that includes the record. The recipient processing system 102 also transmits 714 the record to the anchoring system as an export anchor.

In such a manner, records related to the transaction that is processed across multiple processing systems are chronologically organized and cryptographically linked in the segmented progression. Importantly, through the use of linking records, the records themselves need not be transferred across the processing systems to create the cryptographic link. The use of linking records thus creates a robust system for verifying the integrity of the data related to the transaction without transmitting large amounts of data across processing system boundaries, thus increasing the efficiency and the overall security of the system.

Example Computer System

Figure 8:
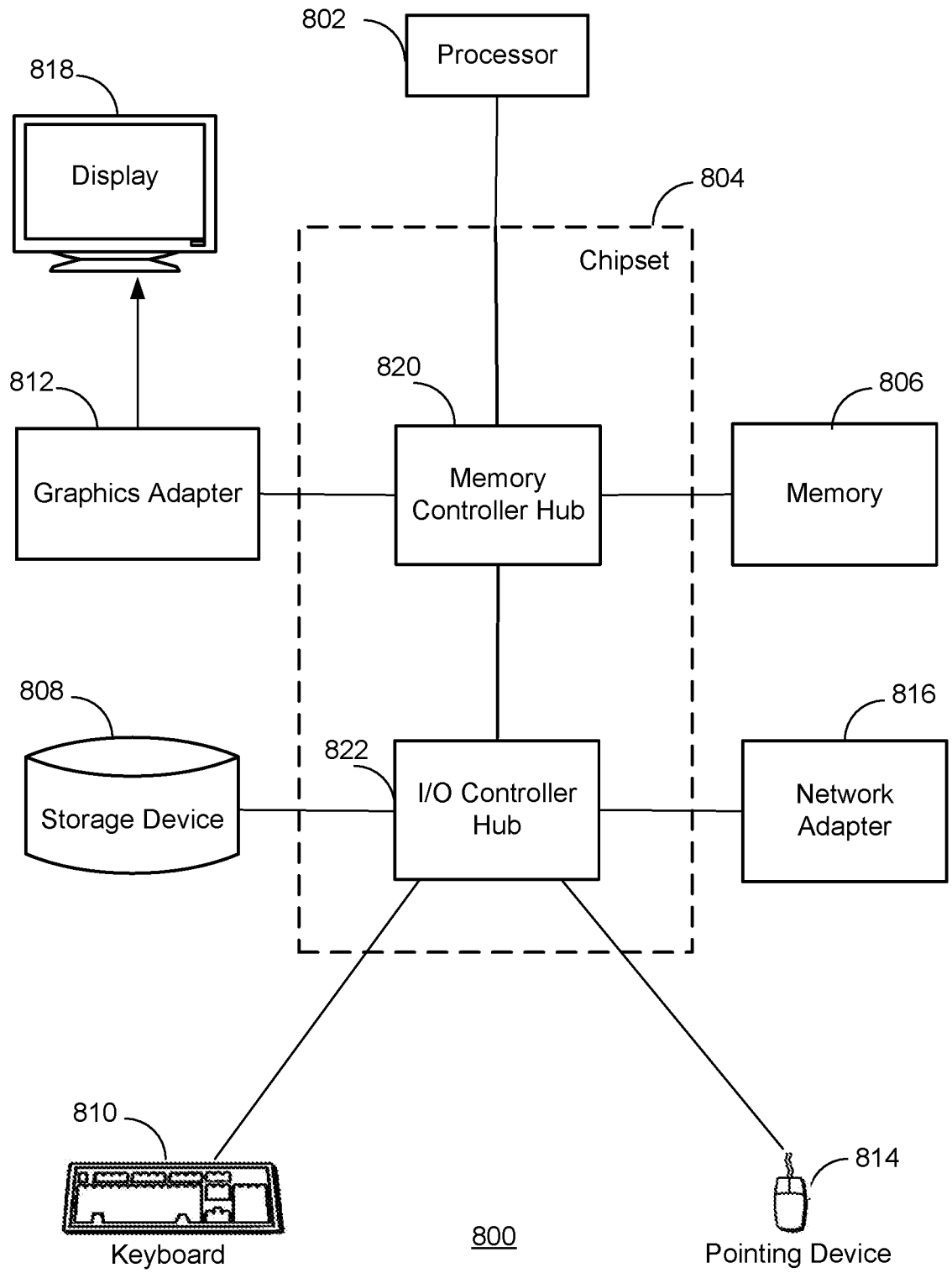
FIG. 8 is a block diagram illustrating a functional view of a typical computer system in accordance with one embodiment.

FIG. 8 is a block diagram illustrating a functional view of a typical computer system 800 for use as one of the systems illustrated in the environment 100 of FIG. 1 in accordance with one embodiment. Illustrated are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O controller hub 822. In another embodiment, the memory 806 is coupled directly to the processor 802 instead of the chipset 804.

The storage device 808 is a non-transitory computer-readable storage medium, such as a hard drive, compact disk read-only memory (CD-ROM), DVD, or a solid-state memory device. The memory 806 holds instructions and data used by the processor 802. The pointing device 814 may be a mouse, track ball, or other type of pointing device, and is used in combination with the keyboard 810 to input data into the computer system 800. The graphics adapter 812 displays images and other information on the display 818. The network adapter 816 couples the computer system 800 to the network 106. Some embodiments of the computer system 800 have different and/or other components than those shown in FIG. 8.

The computer 800 is adapted to execute computer program modules for providing the functionality described herein. As used herein, the term "module" to refers to computer program instruction and other logic for providing a specified functionality. A module can be implemented in hardware, firmware, and/or software. A module is typically stored on the storage device 808, loaded into the memory 806, and executed by the processor 802.

A module can include one or more processes, and/or be provided by only part of a process. Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The types of computer systems 800 used by the systems of FIG. 1 can vary depending upon the embodiment and the processing power used by the entity. Further, the foregoing described embodiments have been presented for the purpose of illustration; they are not intended to be exhaustive or to limiting to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, described modules may be embodied in software, firmware, hardware, or any combinations thereof.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

What is claimed is:

1. A computer implemented data storage method, comprising:
   receiving, at a second event processing system from a first event processing system, a linking object that includes a transaction signature of a record stored in a first segment of a progression, the progression associated with a transaction, and the first segment representing a timeline of events processed by the first event processing system in relation to the transaction, the first segment being stored at the first event processing system with the record stored of the first segment, the record of the first segment not being transmitted to the second event processing system;
   identifying, by the second event processing system, data of a latest event related to the transaction processed by the second event processing system;
   creating, by the second event processing system, an event hash for the latest event based on the identified data;
   creating, by the second event processing system, a transaction hash for the latest event based on the event hash and the transaction signature in the linking object; and
   creating, by the second event processing system, a second segment of the progression to store a first record associated with the latest vent, the first record of the second segment of the progression including the transaction hash for the latest event, wherein the second segment of the progression is stored at the second event processing system separate from the first processing system; and
   comparing a copy of the first record stored in an anchor system to the first record of the second segment of the progression to determine whether the identified data has been modified.

2. The method of claim 1, wherein the linking object also includes a transaction identifier of the transaction.

3. The method of claim 2, wherein creating the transaction hash for the latest event comprises determining that a transaction identifier associated with the latest event matches the transaction identifier included in the linking object.

4. The method of claim 1, further comprising:
   determining that processing of the transaction has reached an intermediate state;
   generating a second linking object based on the transaction hash included in the first record of the second segment of the progression; and
   transmitting the second linking object to a third event processing system to resume processing of the transaction.

5. The method of claim 1, wherein the identified data is comprised of a plurality of data elements and storing the identified data comprises:
   for each of the plurality of data elements:
      applying a hash function to the data element to obtain an element hash; and
      storing the data element in a database using the element hash.

6. The method of claim 5, wherein creating the event hash comprises:
   applying a Merkle tree hashing algorithm to the element hashes of the plurality of data elements to obtain the event hash.

7. The method of claim 1, further comprising:
   determining whether the first record satisfies export criteria; and
   responsive to determining that the first record satisfies the export criteria, transmitting the copy of the first record to the anchor system or storage.

8. The method of claim 7, wherein copies of the record and the linking object are stored in the anchor system.

9. The method of claim 1, wherein the identified data comprises an identifier of the transaction, data to which a process executed for process was applied, and a result of execution of the process.

10. A non-transitory computer readable storage medium comprising computer-executable instructions which when executed by one or more processors cause the one or more processors to perform steps comprising:
    receiving, at a second event processing system from a first event processing system, a linking object that includes a transaction signature of a record stored in a first segment of a progression, the progression associated with a transaction, and the first segment representing a timeline of events processed by the first event processing system in relation to the transaction, the first segment being stored at the first event processing system with the record stored of the first segment, the record of the first segment not being transmitted to the second event processing system;
    identifying, by the second event processing system, data of a latest event related to the transaction processed by the second event processing system;
    creating, by the second event processing system, an event hash for the latest event based on the identified data;
    creating, by the second event processing system, a transaction hash for the latest event based on the event hash and the transaction signature in the linking object;
    creating, by the second event processing system, a second segment of the progression to store a first record associated with the latest event, the first record of the second segment of the progression including the transaction hash for the latest event, wherein the second segment of the progression is stored at the second event processing system separate from the first processing system; and
    comparing a copy of the first record stored in an anchor system to the first record of the second segment of the progression to determine whether the identified data has been modified.

11. The computer readable storage medium of claim 10, wherein the linking object also includes a transaction identifier of the transaction.

12. The computer readable storage medium of claim 11, wherein creating the transaction hash for the latest event comprises determining that a transaction identifier associated with the latest event matches the transaction identifier included in the linking object.

13. The computer readable storage medium of claim 10, further comprising:
    determining that processing of the transaction has reached an intermediate state;
    generating a second linking object based on the transaction hash included in the first record of the second segment of the progression; and
    transmitting the second linking object to a third event processing system to resume processing of the transaction.

14. The computer readable storage medium of claim 10, wherein the identified data is comprised of a plurality of data elements and storing the identified data comprises:
    for each of the plurality of data elements:
        applying a hash function to the data element to obtain an element hash; and
        storing the data element in a database using the element hash.

15. The computer readable storage medium of claim 14, wherein creating the event hash comprises:
    applying a Merkle tree hashing algorithm to the element hashes of the plurality of data elements to obtain the event hash.

16. The computer readable storage medium of claim 10, further comprising:
    determining whether the first record satisfies export criteria; and
    responsive to determining that the first record satisfies the export criteria, transmitting the copy of the first record to the anchor system for storage.

17. The computer readable storage medium of claim 16, wherein copies of the record and the linking object are stored in the anchor system.

18. The computer readable storage medium of claim 10, wherein the identified data comprises an identifier of the transaction, data to which a process executed for process was applied, and a result of execution of the process.

* * * * *